United States Patent [19]
Emori

[11] Patent Number: 5,442,499
[45] Date of Patent: Aug. 15, 1995

[54] METHOD OF DETECTING SECTOR SERVO INFORMATION IN A DISK SYSTEM

[75] Inventor: Teruaki Emori, Kawasaki, Japan

[73] Assignee: Fujitsu Limited, Kawasaki, Japan

[21] Appl. No.: 186,246

[22] Filed: Jan. 25, 1994

Related U.S. Application Data

[63] Continuation of Ser. No. 885,080, May 18, 1992, abandoned, which is a continuation of Ser. No. 390,223, Aug. 7, 1989, abandoned.

[30] Foreign Application Priority Data

Aug. 5, 1988 [JP] Japan .................. 63-195725

[51] Int. Cl.⁶ .................. G11B 5/596; G11B 5/09
[52] U.S. Cl. .................. 360/77.08; 360/48; 360/49; 360/135; 369/44.26
[58] Field of Search .................. 360/48, 49, 51, 77.07, 360/77.08, 135; 369/44.26

[56] References Cited

U.S. PATENT DOCUMENTS

| | | | |
|---|---|---|---|
| 4,847,705 | 7/1989 | Weng et al. | 360/49 |
| 4,862,295 | 8/1989 | Tanaka et al. | 360/49 |
| 4,914,530 | 4/1990 | Graham et al. | 360/48 |
| 4,964,009 | 10/1990 | Moriya et al. | 360/77.08 |
| 4,984,100 | 1/1991 | Takayama et al. | 360/49 |
| 5,036,408 | 7/1991 | Leis et al. | 360/48 |
| 5,177,651 | 1/1993 | Moraru et al. | 360/77.08 |

FOREIGN PATENT DOCUMENTS

| | | |
|---|---|---|
| 0146636 | 7/1985 | European Pat. Off. . |
| 0234957 | 9/1987 | European Pat. Off. . |
| 0243729 | 11/1987 | European Pat. Off. . |
| 59-36374 | 2/1984 | Japan . |
| 63-142576 | 6/1988 | Japan . |

OTHER PUBLICATIONS

IBM Technical Disclosure Bulletin, "Redundant Servo Identification Mark" vol. 30 No. 4, Oct. 1987, p. 239.
Patent Abstracts of Japan, vol. 6, No. 125 (P-127) (1003), Jul. 10, 1982 & JP-A-57-50313.

*Primary Examiner*—Robert S. Tupper
*Assistant Examiner*—Jefferson Evans
*Attorney, Agent, or Firm*—Staas & Halsey

[57] ABSTRACT

A method and apparatus for detecting sector servo information in a disk system, uses sector servo information with at least one auxiliary confirming code pattern provided in addition to conventionally-used sector mark, track address and servo position information. Generation of a group of timing signals to detect a selected portion of the sector servo information, is adjusted by detecting the auxiliary confirming code pattern so that the timing signal is synchronized with the selected portion of the sector servo information In another embodiment, synchronization is performed using a predetermined number which is loaded into a counter circuit when the auxiliary confirming code pattern is detected.

16 Claims, 11 Drawing Sheets

METHOD OF DETECTING SECTOR SERVO INFORMATION IN A DISK SYSTEM

This application is a continuation of application No. 07/885,080 filed May 18, 1992, now abandoned, which is a continuation of application No. 07/390,223 filed Aug. 7, 1989, now abandoned.

BACKGROUND OF THE INVENTION

1. Field of the Invention

This invention relates to a method of detecting sector servo information recorded on a disk surface in a recording and reproducing system. In providing servo information in a disk system, two methods are generally utilized. In a first method, the servo information is recorded on a separate disk or on a separate disk surface and, in a second method, it is recorded interspersed on the same disk surface as the work data. The present invention particularly relates to the second method, in which the work data and the servo information are arranged in alternating sectors on the same disk surface. In the present invention, this method is conventionally called sector servo method in a disk system.

2. Description of the Related Art

Figure 1A:
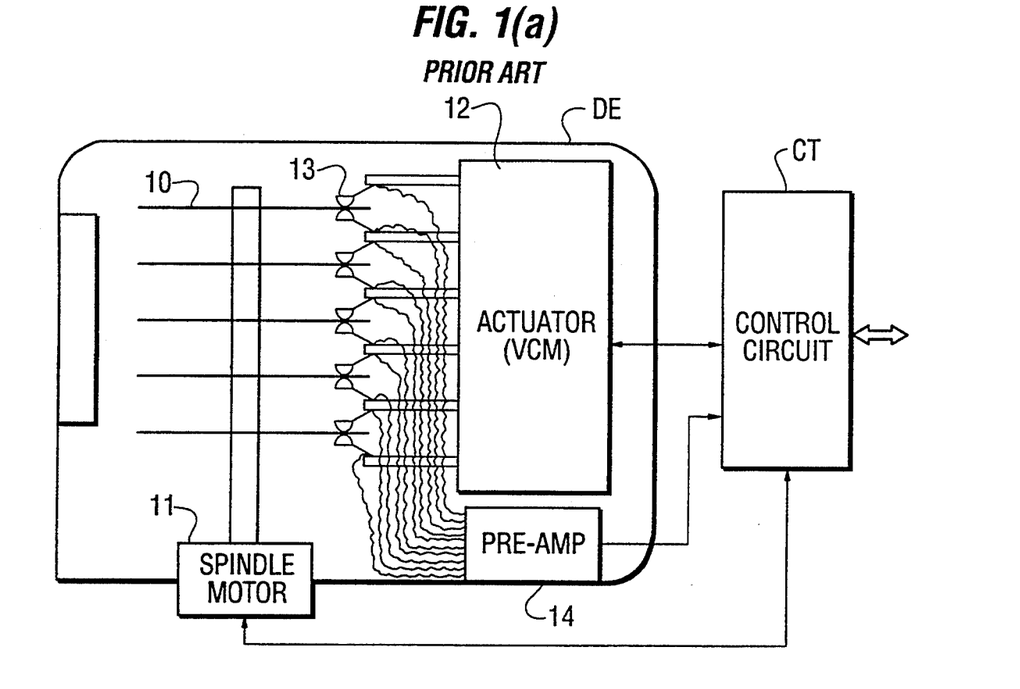
FIG. 1(a) is a schematic and block diagram of a disk system for explaining the general principle of the sector servo method.

FIG. 1(a) is a schematic and block diagram of a disk system for explaining the general principle of the sector servo method. The disk system comprises a disk enclosure DE and control circuit CT connected to a higher command system.

The disk enclosure DE comprises a spindle motor 11 which drives a plurality of disks 10, an actuator 12 which is driven by a voice coil motor (VCM), a plurality of magnetic heads 13 fixed to the actuator 12, and a pre-amplifier 14. The magnetic heads 13 are disposed on both surfaces of each disk 10 and can move within a specified zone on the disk surface with the forward and backward movements of the actuator 12. The pre-amplifier 14 is provided to adjust signal levels of an output of the magnetic head 13 and is input to a main amplifier (not shown) during read and write periods of the disk system.

The control circuit CT has functions of controlling such as rotational movement of the spindle motor 11, radial positioning of the magnetic head 13 on the disk surface, and controlling read/write operations of the magnetic head, detection of the sector servo information and interface operation with the higher command system.

Figure 1B:
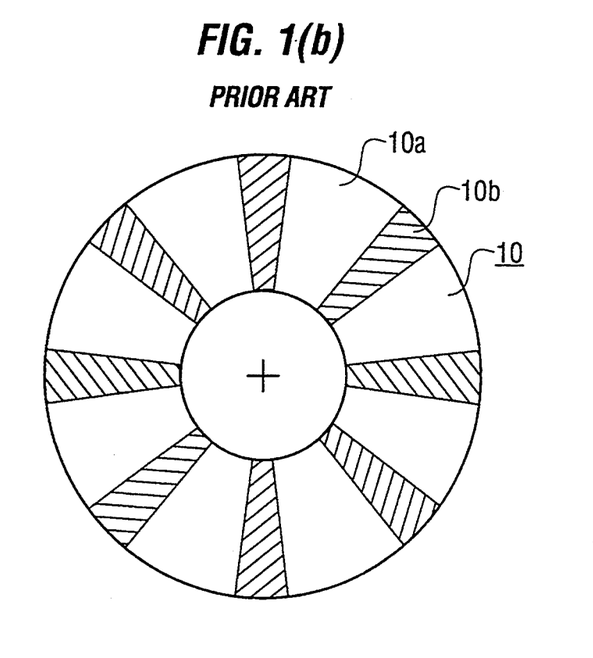
FIG. 1(b) shows a disk surface by the sector servo method, where a servo sector and a data sector are formed interspersed alternately.

One surface of the disk 10 is divided into a plurality of sectors, which are shown schematically in FIG. 1(b). In the Figure, eight servo information sectors 10b (briefly called servo sector) are interspersed alternately with eight work data sectors 10a (briefly called data sector). Sector servo information includes track address information and servo position information, and further includes supplementary code information such as a code sequence for automatic gain control for the associated circuits and a code sequence for discriminating the servo sector from the data sector.

When the disk system receives a command to access the specified track number on the disk surface, the magnetic head is made to move within the immediate proximity of the target track. After detecting the servo position information of the sector servo information, the magnetic head 13 is controlled to be positioned in accurate alignment with the target track.

In order to read the sector servo information, this servo information should be discriminated at first from the work data among a reproduced signal sensed by the magnetic head. A discrimination method utilizing dependency on the angular position of the spindle motor 11 is apt to become inaccurate due to a change of the rotation of the spindle motor, a temperature change in the disk enclosure DE, etc. Therefore, the following method of discrimination has been used in the prior art.

Figure 2:
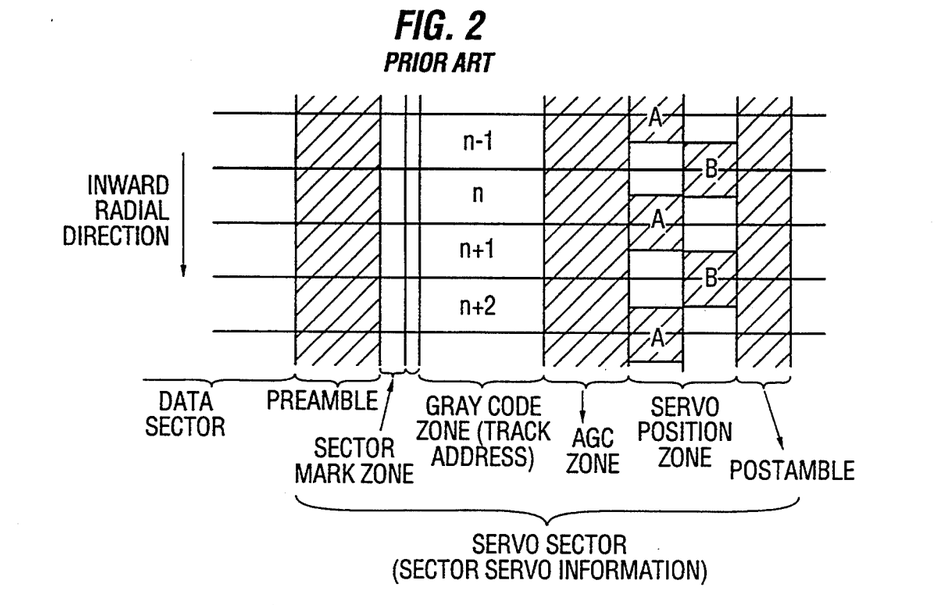
FIG. 2 shows schematically a portion of a servo sector where each track is divided into plural zones.

FIG. 2 shows schematically a portion of a plurality of tracks in one of servo sectors, wherein the sector servo information is divided into plural zones. Only four tracks n−1, n, n+1, and n+b 2 are illustrated in the FIG. 2, in which the downward direction shows an inward radial direction of the disk surface. The servo sector 10b comprises a plurality of zones such as preamble zone, sector mark zone, gray code zone designating a track address, AGC zone, servo position A and B zones and postamble zone. Among these zones, preamble and postamble zones are provided to separate the sector servo information from the work data information. The sector mark is utilized as an identification code for beginning of the sector servo information.

Figures 3A, 3D:
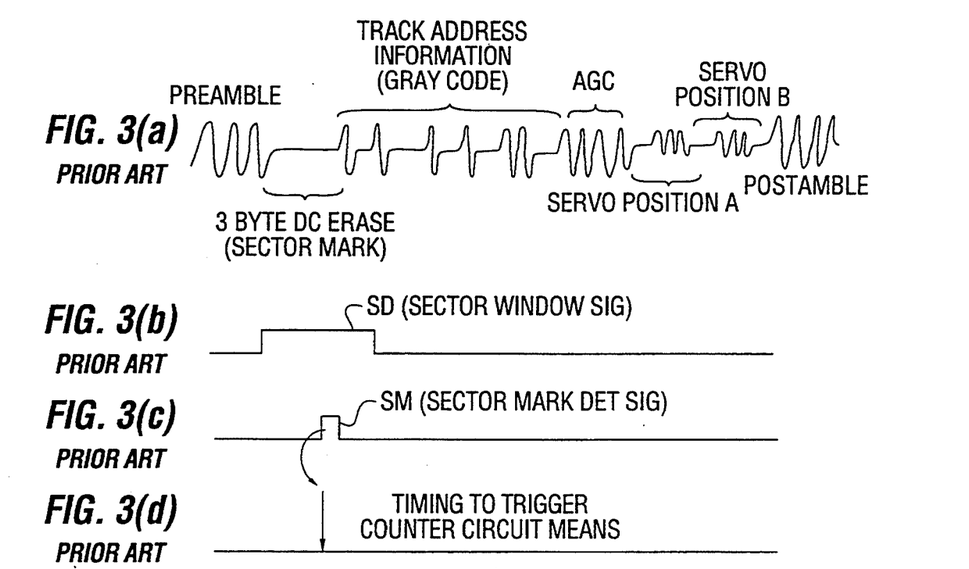

An example of an output signal of the sector servo information is schematically illustrated by the waveform of FIG. 3(a). The output of the sector mark is a DC erase pattern of three byte length. The sector mark output is followed by a track address information encoded in the known Gray code sequence. And next, an AGC (Automatic Gain Control) signal output follows, which is a regular sequence of codes such as 1, 1, . . . 1, and is used to fix signal levels in the associated circuits at a predetermined level. Finally, servo position A and B outputs follow thereafter.

As shown in FIG. 2, each of servo position information is recorded in a track having a half track pitch deviation from the track for other information. When the magnetic head travels in accurate alignment with the target track, the detected servo position outputs A and B have substantially the same level. However, when the magnetic head position deviates from the center line of track, the detected servo position outputs A and B have different signal levels, which are sensed and used for aligning the magnetic head.

In order to extract each information included in the sector servo information from the output signal from the magnetic head, it is very important problem to generate a plurality of timing signals which are synchronous with the selected portion of the sector servo information. For generating the timing signals, a counting circuit means, which is comprised in a demodulation circuit of sector servo information, is utilized and is set to start at an appropriate time t as shown in FIG. 3(d). The counting circuit means generates a specified signal, so called, a sector window signal as shown in FIG. 3(b), during which a sector mark detection signal SM is generated as shown in FIG. 3(c). The sector mark detection signal further triggers the above counter circuit means at time t and thus it makes the counter circuit means synchronous with the output signal of the sector servo information.

Because the sector mark signal of three byte DC erase pattern should be detected during the sector window signal of FIG. 3(b), the sector window signal should be made synchronous with the sector servo information.

In the sector servo method of the prior art, the synchronization is obtained solely depending on detection of the sector mark signal composed of the DC erase pattern of three byte length. Though the DC erase pattern of three byte length is quite different from other series of code patterns such as the work data recorded on disk surface, the detection of the sector mark signal causes a problem when the sector mark comprises defects in the recording medium or the detection thereof is affected by outward noise pulses.

If the sector mark signal can not be detected, then the sector servo information can not be detected and further, in some cases, the recorded sector servo information will be destroyed during write operation of the disk system. Moreover, when the sector mark signal can not be detected, the sector window signal goes out of synchronous condition, which further increases a difficulty in detecting the sector mark.

To solve the above problem, the following references are disclosed in the Japanese Unexamined Patent Publications.

SH0-59-36374 dated Feb. 28, 1984 by M. Tsunekawa et al.

SH0-63-142576 dated June 14, 1988 by K. Yamada.

SUMMARY OF THE INVENTION

It is a general object of the invention, therefore to provide a method of detecting sector servo information even when noises are included in detecting a sector mark.

It is a more specific object of the invention to provide a method of detecting sector servo information more precisely even when noises are included in detecting a sector mark, wherein a plurality of timing signals are generated by setting a counter circuit means at a predetermined value, the timing signal being synchronous with the selected portion of the sector servo information and the detection of the sector servo information is checked by detecting an auxiliary confirming code pattern specially formed in the sector servo information.

It is another object of the invention to provide a method of detecting sector servo information still more precisely and reliably even when noises are included in detecting a sector mark, wherein the timing signals are adjusted to be precisely synchronous with the selected portion of the sector servo information by setting the counter circuit means at another predetermined value when the auxiliary confirming code pattern is detected.

Foregoing and related objects in detecting the sector servo information having noises are accomplished by the following method of the present invention. The principle of the invention is schematically shown in a block diagram of FIG. 4.

In a sector servo detecting method of a disk system, wherein the sector servo information is recorded in a servo sector interspersed alternately with a data sector on the same track of a disk surface, the sector servo information comprising at least a sector mark, track address, and servo position information, said method of the present invention comprises the steps of providing at least one auxiliary confirming code pattern in the sector servo information, discriminating the auxiliary confirming code pattern besides the sector mark from a signal reproduced by a magnetic head, and thereafter detecting the sector servo information.

The method of the present invention further comprises the steps of generating a group of timing signals from a timing signal generator means controlled by a counter circuit means which is set at a predetermined time when the sector mark and the auxiliary confirming code pattern are detected, and detecting the selected portion of the sector servo information utilizing the respective timing signal.

The method of the present invention still further comprises the steps of setting the counter circuit means at a first predetermined time when the sector mark is detected and setting at a second predetermined time when the auxiliary confirming code pattern is detected.

The method of the present invention still further comprises the steps of forming a first and second auxiliary confirming code patterns and setting the counter circuit means at a third predetermined time when the second auxiliary confirming code pattern is detected.

Details of these modifications will become clear from a reading of the detailed description of the invention with reference to the drawings.

BRIEF DESCRIPTION OF THE DRAWINGS

FIG. 3(a) shows schematically a reproduced signal waveform of the prior art, and FIGS. 3(b) to 3(d) show timing charts of signals related to detection of the sector servo information shown in FIG. 3(a), FIGS. 11(a) through 11(h) are timing charts, where

DETAILED DESCRIPTION OF THE PREFERRED EMBODIMENTS

Figure 5:
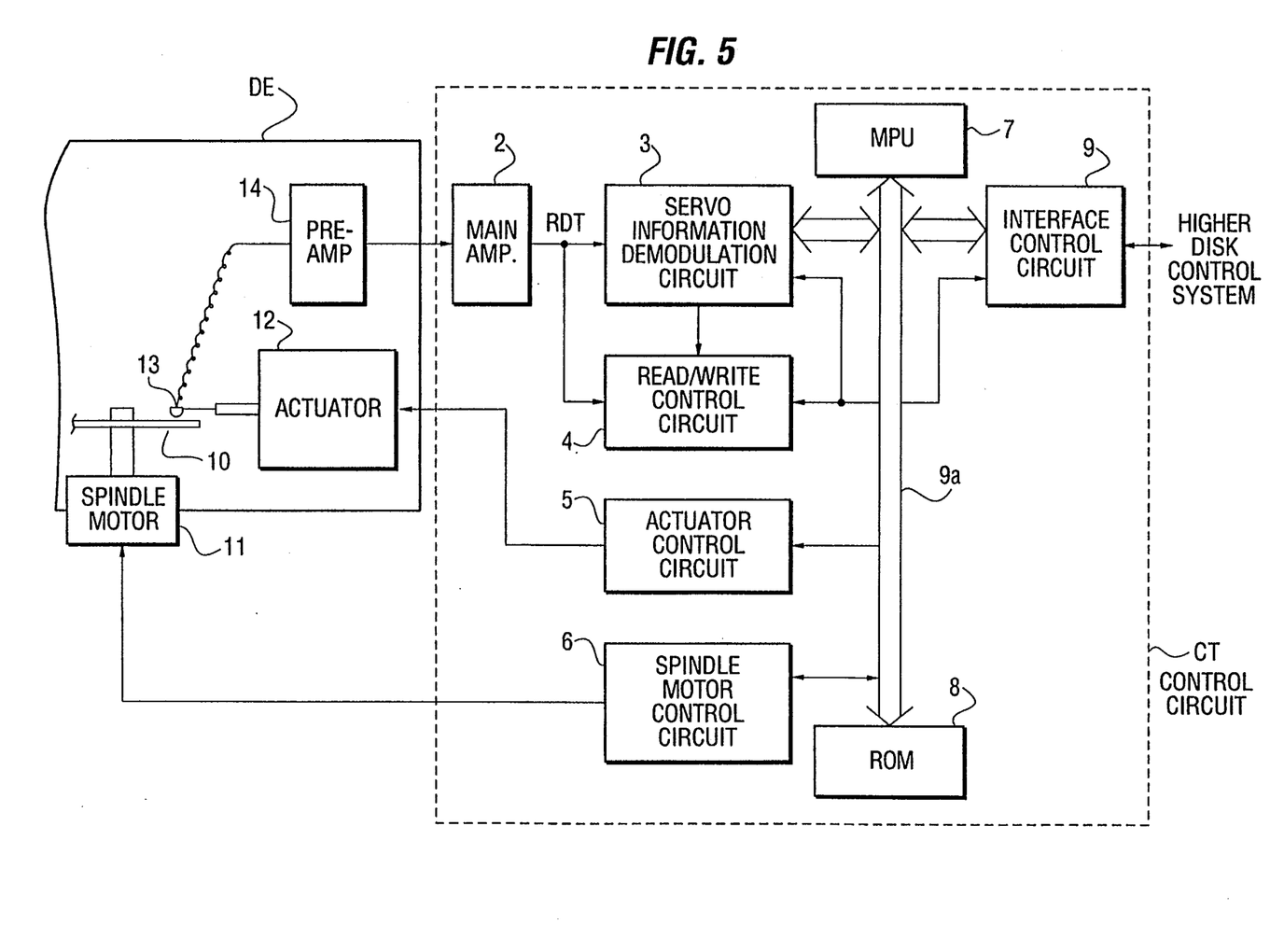
FIG. 5 is a block diagram showing a control circuit outline of a disk system of the present invention.

FIG. 5 is a block diagram of one of the preferred embodiments of the present invention, in which principal circuit elements related with the present invention and associated mechanical parts such as a spindle motor 11, actuator 12 and magnetic head 13 are shown. Throughout the drawings, the same or similar numerals designate and identify the same or similar parts.

A signal sensed by a magnetic head 13 is amplified by a pre-amplifier 14 and applied further to a main amplifier 2 included in a servo control circuit CT (dashed line). A reproduced signal RDT is applied to a servo information demodulation circuit 3, which is the main portion of the present invention, where a sector mark and an auxiliary confirming code pattern are identified and detected from the sector servo information and a group of synchronized timing signals are generated synchronous with an occurrence of each constituent servo information.

The RDT signal is also applied to a read/write control circuit 4 which is operatively connected to the servo information demodulation circuit 3 and a bus line 9a. The read/write control circuit 4 controls recording/reproducing operations of the magnetic head 13. An actuator control circuit 5 is connected to the bus line 9a and controls an actuator 12 for positioning the magnetic head 13. A spindle motor control circuit 6 is also connected to the bus line and controls rotation of a spindle motor 11 under a command from a microprocessor unit 7. The microprocessor unit, MPU 7 has functions to control all circuits such as the servo information demodulation circuit 3, read/write control circuit 4, actuator control circuit 5 and spindle motor control circuit 6. A memory circuit 8 including read only memory units stores necessary programs to operate the MPU 7 and associated circuits.

These circuits and units are connected mutually and to the bus line 9a. The bus line 9a is further connected to an interface control circuit 9 which is under the control of a higher disk control system.

Figure 6:
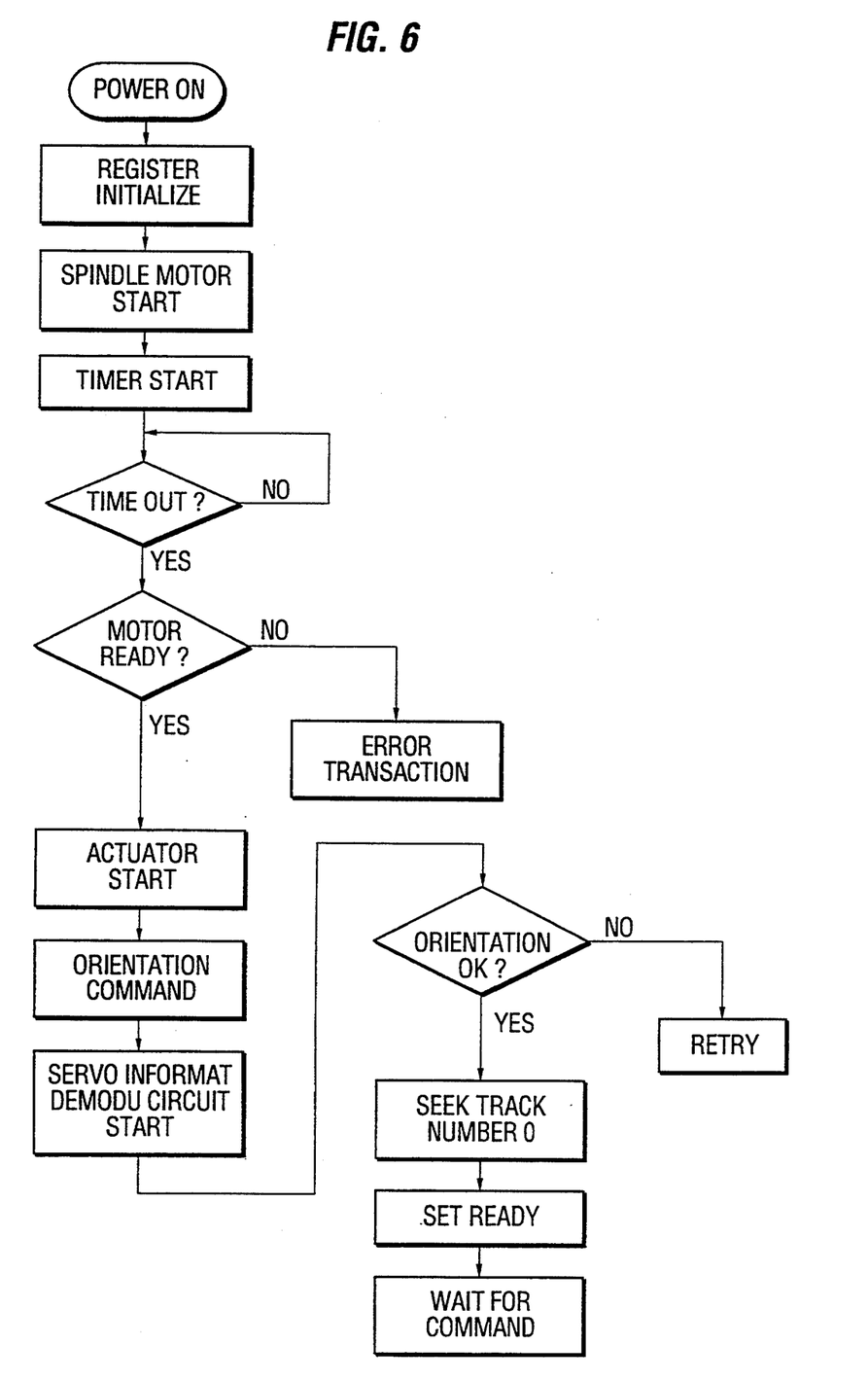
FIG. 6 is a flow chart of the starting steps of a disk system according to the present invention.

FIG. 6 is a flow chart of the starting steps for a disk system according to the present invention. The details of these steps are explained using FIGS. 5 and 6.

(1) When a power source of the disk system is switched on, all registers used in the servo control circuit CT are cleared or initialized by the MPU 7, and the spindle motor 11 starts by a command of the spindle motor control circuit 6. At the same time, the MPU 7 commands a timer (not shown in FIG. 5) to start. After a predetermined elapse of time, MPU 7 checks whether the spindle motor control circuit 6 outputs a Motor Ready signal or not. If the Motor Ready signal is not output, MPU 7 gives a command to go to an Error Transaction branch because of the spindle motor 11 has not reached a definite speed.

(2) When the spindle motor 11 reaches the normal rotation speed, the Motor Ready signal is output to the MPU 7 from the spindle motor control circuit 6. When the MPU 7 receives the Motor Ready signal, it gives a command to the actuator control circuit 5 that the magnetic head 13 positioned at CSS zone (Contact Start Stop zone, the most inside zone of the disk surface) are to move toward a read/write zone on the disk surface.

(3) At this time, an orientation command OR is given to the servo information demodulation circuit 3 from the MPU 7. By the orientation command OR, an initial sector window signal is generated in the servo information demodulation circuit 3. An erase detection circuit included in the servo information demodulation circuit 3 detects the sector mark, and a counter circuit which is also included therein, makes a timing signal generation circuit generate the timing signals. When a synchronized condition is obtained, such that the group of timing signals such as a servo window signal, sector window signal, servo gate signal, etc., are synchronous with a signal occurrence of the respective selected portion of the sector servo information, an orientation OK command OROK is given to the MPU 7.

Figure 4:
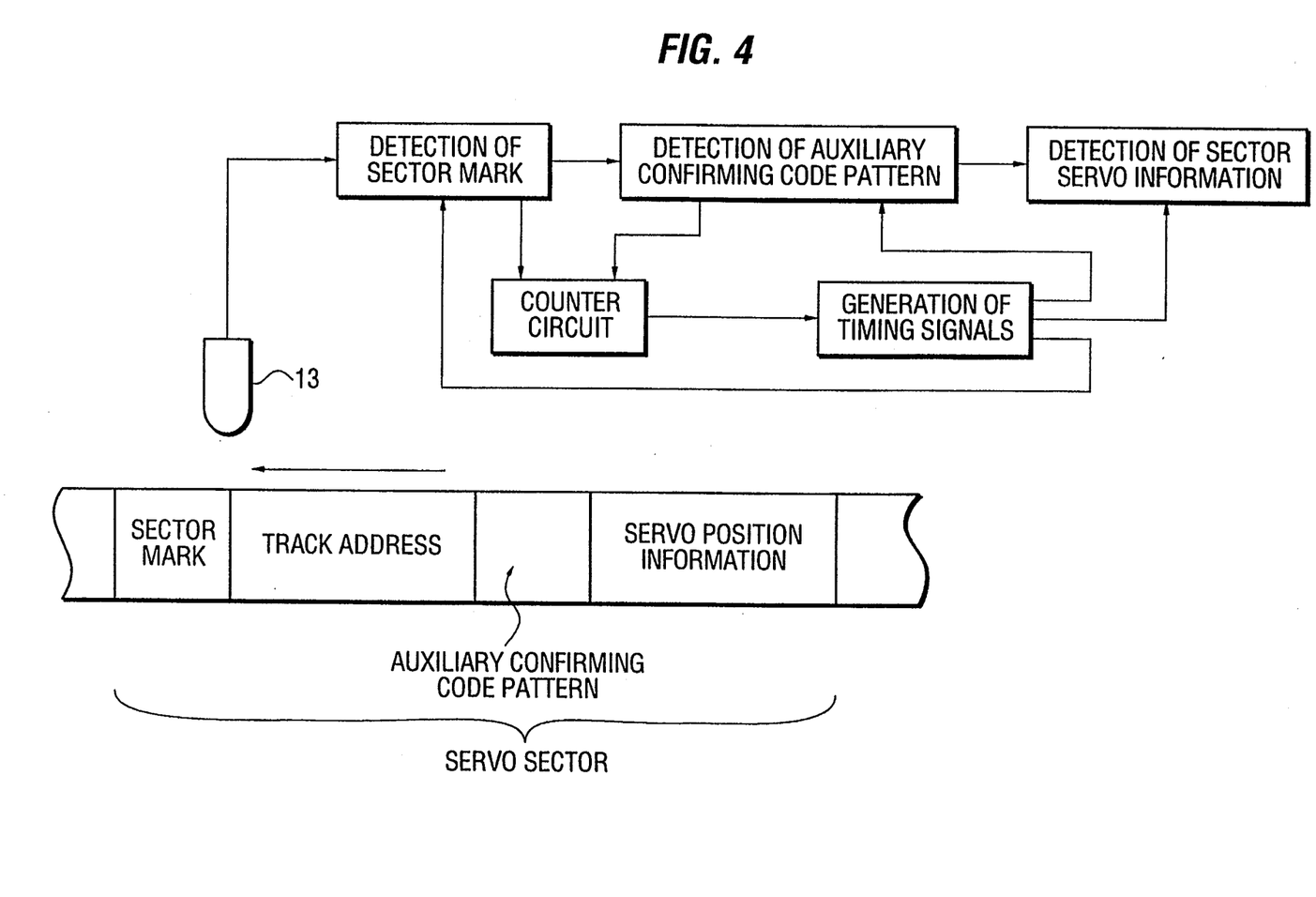
FIG. 4 is a block diagram for explaining the principle of the present invention.

In generating timing signals, the sector mark and auxiliary confirming code pattern or patterns, for example, as explained in FIG. 4, are detected and checked, and the timing signals are adjusted to be synchronous with the selected portion of the sector servo information. By the command of OROK, the MPU 7 becomes ready to receive the sector servo information. The further detailed functions of the servo information demodulation circuit 3 are explained later.

(4) As explained in the step (3), when the synchronous condition is obtained, the servo information demodulation circuit 3 gives an orientation OK command OROK to the MPU 7, however, when the synchronous condition is not obtained, the orientation OK command OROK is not issued and the step goes to a retry procedure.

(5) With receiving the OROK command, the MPU 7 gives a command to the actuator control circuit 5 to access track "0", which is the outermost peripheral track on the disk surface. The magnetic head 13 is made to move toward track "0" by an actuator 12. When the track "0" is accessed, a Ready signal is set in the interface control circuit 9, which is made ready for receiving a further command from the higher disk control system. Once generation of synchronized timing signals is obtained, the orientation 0K command OROK is given to the MPU 7, and the MPU is ready to discriminate the track address and servo position information and to control the magnetic head at a right place.

Once the synchronous condition is acquired, the method of the present invention prevents deviation from synchronization, because the synchronization is checked and adjusted plural times by detecting the sector mark and auxiliary confirming code patterns in the sector servo information.

Figure 7:
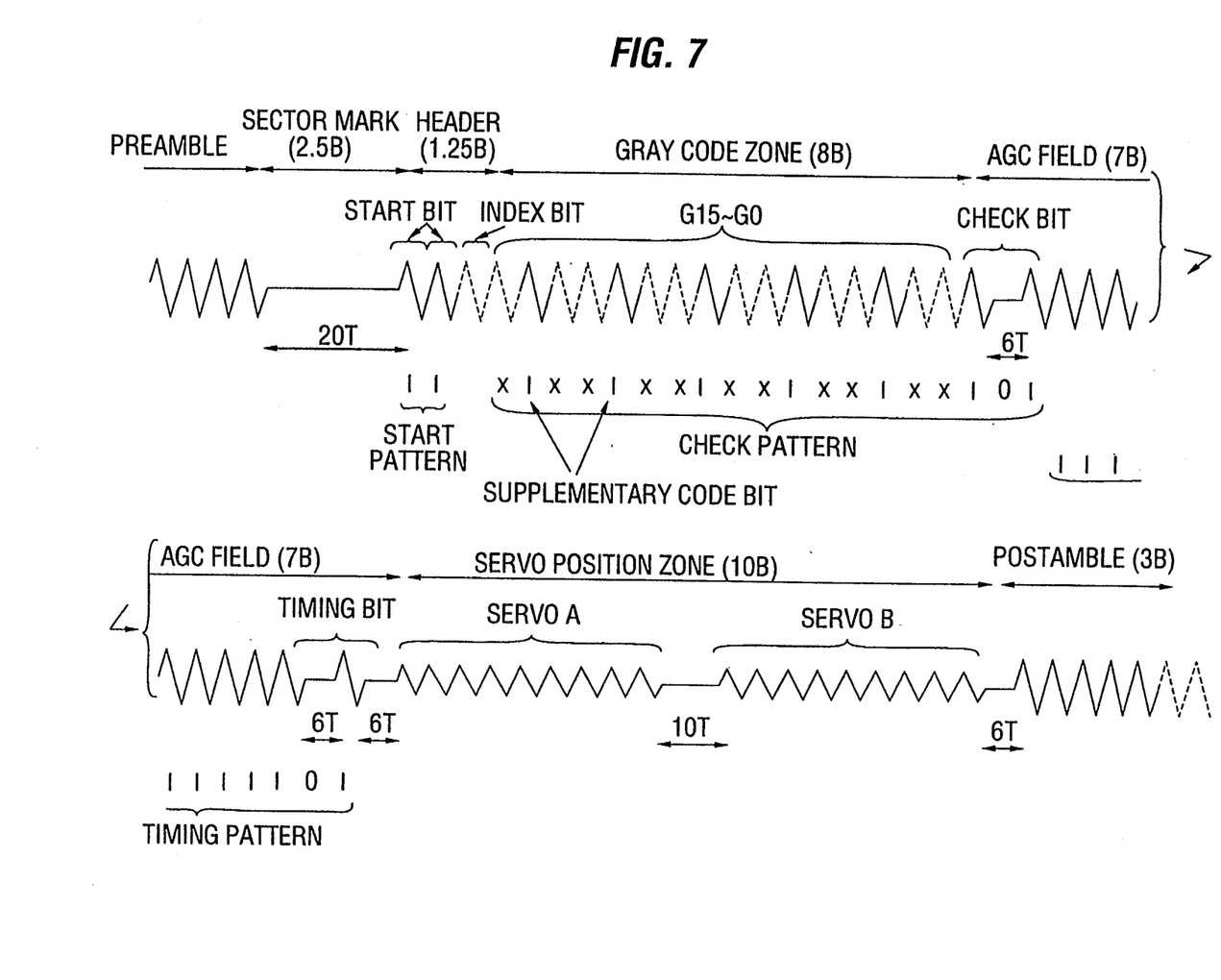
FIG. 7 shows a format of the sector servo information according to the present invention.

Next, the detailed circuit units and functions thereof comprised in the servo information demodulation circuit 3 are explained. FIG. 7 shows one of the formats of sector servo information of the present invention. In FIG. 7, each bit signal is illustrated schematically by a triangular waveform for easy understanding of the signal pattern.

The sector servo information is composed of a sector mark of erase code pattern having a length of 20T (or 2.5 bytes where 1 byte=8T) duration, (herein T denotes one bit duration for recording one bit of work data), header of 10T (or 1.25 bytes, gray code zone of 64T (or 8 bytes), AGC field of 56T or 7 bytes, servo position zone of 80T (or 10 bytes), and postamble of 24 (or 3 bytes).

The sector mark is the erase code pattern having 2.5B duration. The header comprises a pair of start bits, which is a notice of the start of the gray code zone.

According to the present invention, the output from the gray code zone is composed of 11 bit codes having the track address information expressed in the gray code sequence, and further 5 bit codes of supplementary codes used for the auxiliary confirming code patterns. The supplementary codes of "1" are arranged having two successive gray codes therebetween denoted by "x" as shown in FIG. 7. The reason for using the supplementary codes is to avoid a misjudgement such that the track address having the gray code sequence of all "0" is detected as a sector mark of the erase pattern. By interspersing supplementary codes among the gray code sequence, the detection of the sector mark becomes more reliable and, moreover, the supplementary code sequence can be utilized as a part of the auxiliary confirming code pattern of the present invention.

The AGC field is composed of a check bit sequence of 3 bits of "101", an AGC bit sequence of 7 bits and a timing bit sequence of 3 bits of "101".

Each output of servo A and servo B from the servo position zone is composed of a 9 bit sequence of constant codes such as "11 ... 1". When the magnetic head travels along the center line of the track, the output levels of servo A and B are the same level, however, when the magnetic head is off from the track center, the levels thereof are different, which is utilized to adjust the magnetic head position.

In the preferred embodiment, two auxiliary confirming code patterns are used and inserted in the sector servo information. A first auxiliary confirming code pattern is called a check pattern and a second is called a timing pattern in the embodiment. Because two auxiliary confirming code patterns are formed between the sector mark and the servo position zone, the method of detecting sector servo information of the embodiment is effective against noises included therein.

The check pattern is composed of 19 bit codes expressed by a sequence such as "x 1 x x 1 x x 1 x x 1 x x 1 x x 101" as shown in FIG. 7, wherein "x" denotes one of track address codes expressed in the gray code sequence. Among 19 bit codes, the first 16 bit codes are recorded in the gray code zone and the last 3 bits called the check bit are recorded in the AGC field. The first 5 bits of "1", having intervals of 2 bits of "x", are supplementary code bits of the present invention.

The timing pattern is composed of 10 bit codes expressed by a sequence of "1111111101". The first 7 bits are commonly used as the AGC bits. The last 3 bits of "101" are the timing bit sequence as explained.

Figure 8:
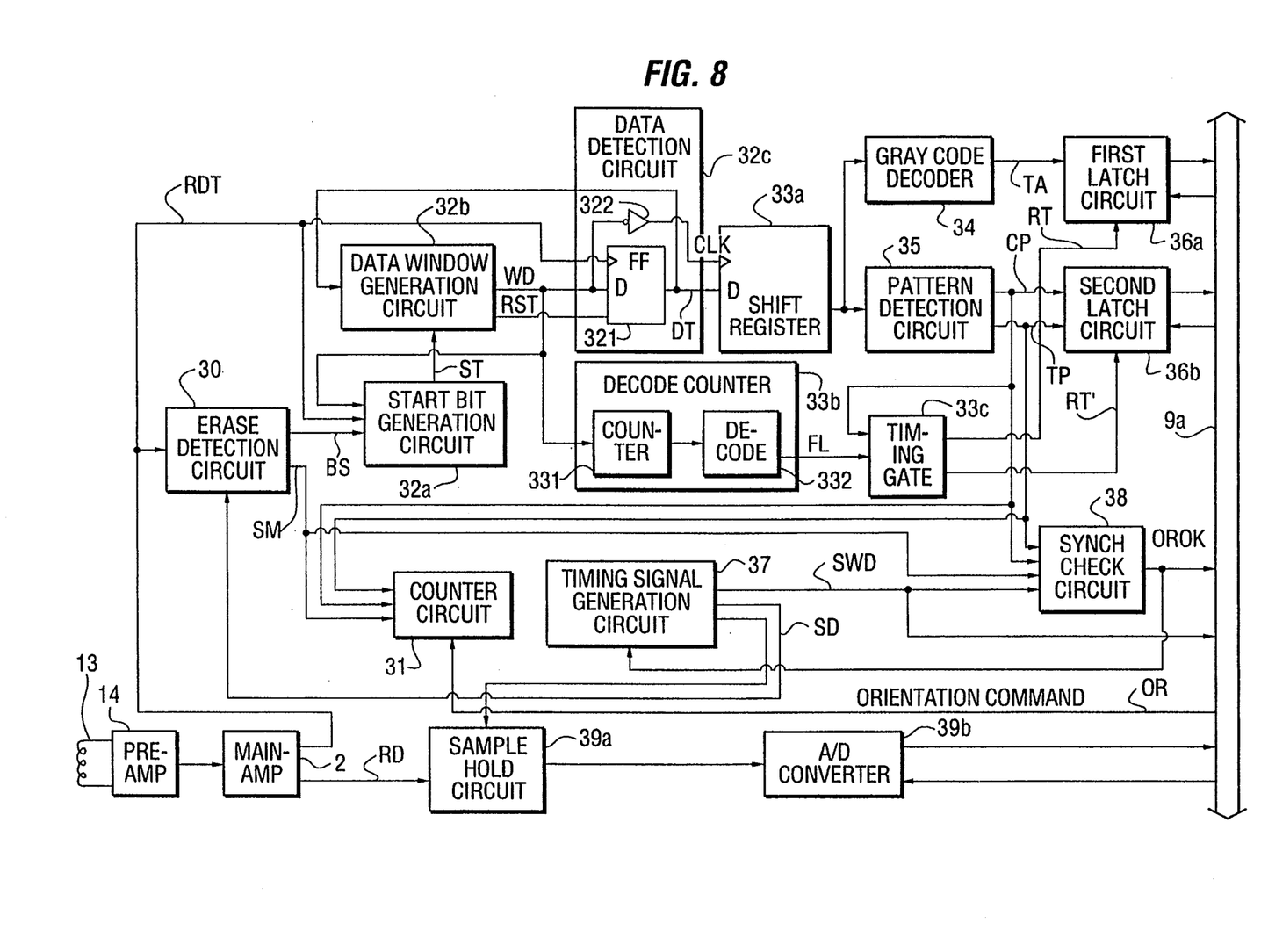
FIG. 8 is a detailed block diagram of the servo information demodulation circuit of the present invention.

FIG. 8 is the detailed block diagram of the servo information demodulation circuit 3 of FIG. 5. The function of each element is explained in the following discussions.

Figure 9:
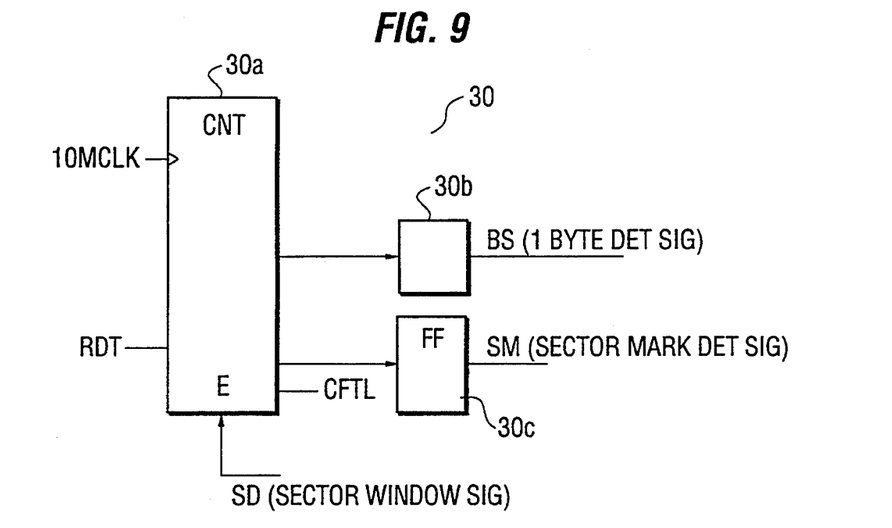
FIG. 9 is a further detailed block diagram of an erase detection circuit of the present invention.

An erase detection circuit 30 has functions of detecting 1 byte and 2 byte lengths of erase pattern of sector mark during a sector window signal SD, which is one of the timing signals, and outputs one byte detection signal BS and a sector mark detection signal SM respectively. The details of the erase detection circuit 30 is shown in FIG. 9, and comprises a counter 30a, a latch circuit 30b and a flip-flop 30c. A 10 MHz clock signal is input to the counter 30a which counts the number of clocks. The counter 30a is enabled by the sector window signal SD and cleared by the RDT signal. When the counter 30a counts the number of clocks equivalent to one byte (8 bits) length, one byte detection signal BS is output from the latch circuit 30b, and the signal BS is input to a start bit detection circuit 32a. When the counter 30a counts the number of clocks equivalent to two byte length, it triggers a flip-flop 30c. The sector mark detection signal SM, arranged into a pulse waveform, is output to a counter circuit 31.

The sector window signal SD in the above explanation is generated from the counter circuit 31 and timing signal generation circuit 37, which are explained later.

The start bit detection (or "generation") circuit 32a detects the header code signal formed of a pair of start bits after the byte detection signal BS from erase detection circuit 30 is input thereto. The start bit detection circuit 32a generates a demodulation start signal ST to a data window generation circuit 32b. The data window generation circuit 32b generates a data window signal WD which is a timing signal corresponding to each bit of the data signal in the RDT signal for detecting the same. Detection of the RDT is performed by a data detection circuit 32c comprising a flip-flop 321 and an inverter 322. The flip-flop 321 receives the RDT as a clock signal and the data window signal WD as a data signal.

The detected signal DT from the flip-flop 321 is input to a shift register 33a clocked by the inverted WD signal, where the detected signal DT is arranged and stored in series, and can be used as a parallel data sequence.

A decode counter 33b comprises a counter 331 for counting the WD signal and a decoder 332 which judges whether the counter 331 has reached the predetermined count number such as a duration for the detected signal codes to fill the shift register 33a or not, and gives a signal to the following timing gate circuit 33c.

A pattern detection circuit 35 discriminates the check pattern of 19 bits and the timing pattern of 10 bits stored in the shift register 33a and outputs the respective check pattern detection signal CP and timing pattern detection signal TP, and both CP and TP signals are latched in a second latch circuit 36b, which is connected to the bus line 9a, by a latch signal RT' output from the timing gate circuit 33c.

On the other hand, the gray code information from the shift register 33a is decoded in a gray code decoder 34 and is output as a binary code signal TA of the track address and latched in a first latch circuit 36a by the latch signal RT from the timing gate circuit 33c. The track address is given to the bus line 9a.

Figure 10:
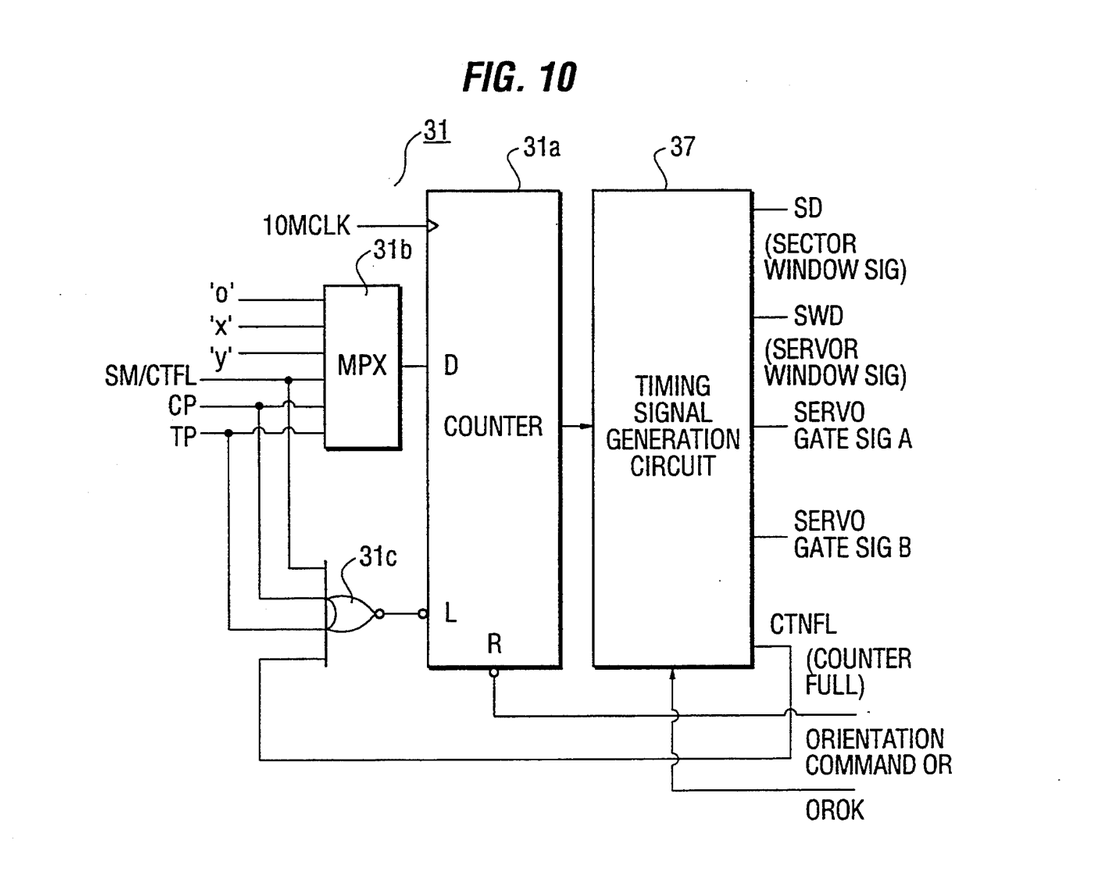
FIG. 10 is a further detailed block diagram of means for generating a group of timing signals of the present invention, in which a counter circuit and a timing signal generation circuit are comprised.

A group of timing signals are generated by the counter circuit 31 and timing signal generation circuit 37 which are briefly referred to previously. Details of the counter circuit 31 and timing signal generation circuit 37 are shown in FIG. 10. The counter circuit 31 comprises a counter 31a, a multiplexer 31b and an OR gate 31c in which the counter 31a is reset by an orientation command OR from the bus line 9a. The multiplexer 31b selects the data "0" and loads the data "0" into the counter 31a when the sector mark detection signal SM or a count full signal CTFL from the counter 30a in FIG. 9 is input thereto, and the SM and CTFL signals are also input to the OR gate 31c. The data "x" is loaded in the counter 31a when the check pattern detection signal CP is input to the multiplexer 31b and the OR gate 31c. And further, the data "y" is loaded in the counter 31a when the timing pattern detection signal TP is input to the multiplexer 31b. The timing signal generation circuit 37 generates a group of timing signals such as servo window signal SWD, sector window signal SD, servo gate signal A and servo gate signal B.

The timing signal generation circuit 37 outputs also a count full signal CTNFL which is input to the OR gate 31c.

A synchronization check circuit 38 receives the check pattern detection signal CP, timing pattern detection signal TP, sector mark detection signal SM, and servo window signal SWD. The synchronization check circuit 38 outputs an orientation OK command OROK to the bus line 9a when inputs of these signals are detected twice successively.

A sample hold circuit 39a retains peak values of the servo position signals A and B comprised in an analogue signal RD from the main amplifier 2, utilizing the servo gate signals A and B. An A/D converter 39b converts analogue outputs corresponding to the peaks of servo position signals A and B to digital outputs which are applied to the bus line 9a.

As explained above, the servo information demodulation circuit 3 of the present invention comprises the erase (sector mark) detection circuit 30 and the pattern detection circuit 35 for detecting two auxiliary confirming code patterns such as the check pattern and timing pattern, both being recorded in the sector servo information. The timing signal generation circuit 37 generates the timing signals with the aid of the counter circuit 31, in which the synchronous condition can be checked by any of the sector mark, check pattern and timing pattern.

And next, the detailed operation or function of the servo information demodulation circuit 3 of the embodiment is explained using FIGS. 11 through 16.

(1) When the orientation command OR is given from the MPU 7 of FIG. 5, the counter circuit 31 and other registers are all reset or cleared. The erase detection circuit 30 begins to search a sector mark of erase pattern utilizing an initial sector window signal output from the timing signal generation circuit 37 by the OROK command.

(2) When the erase detection circuit 30 detects the erase pattern of 8 bit length, it outputs the byte detection signal BS to the start bit detection circuit 32a, which is made to be active.

Figures 11A, 11B, 11C, 11D:
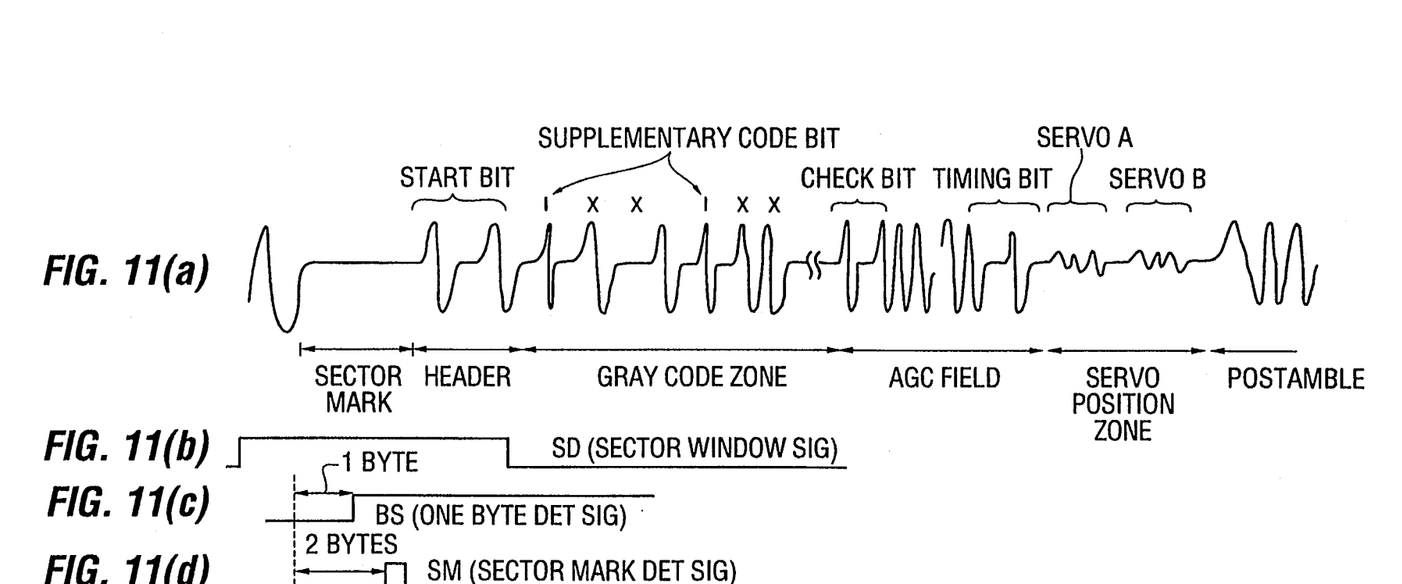
FIG. 11(a) is a reproduced signal and FIGS. 11(b) to 11(h) are related signals for detecting the sector servo information of the present invention.
Figures 11E, 11F, 11G:
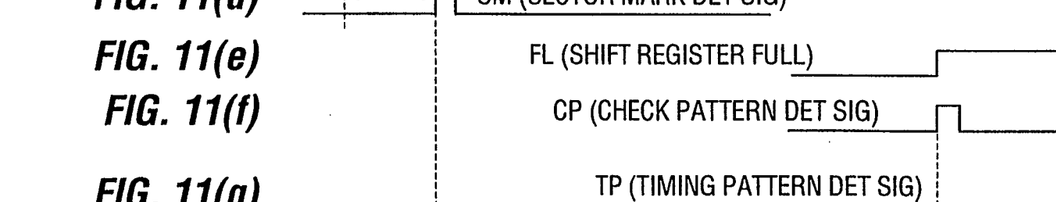
Figure 11H:
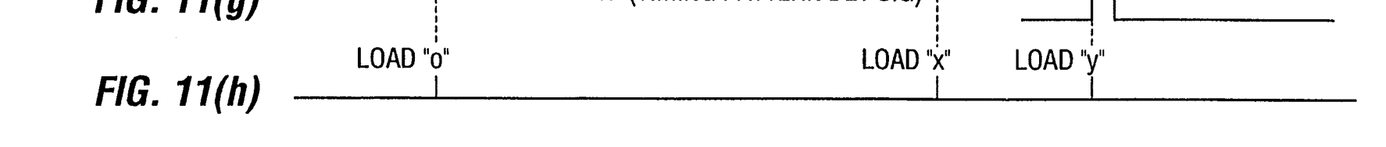
Figure 12:
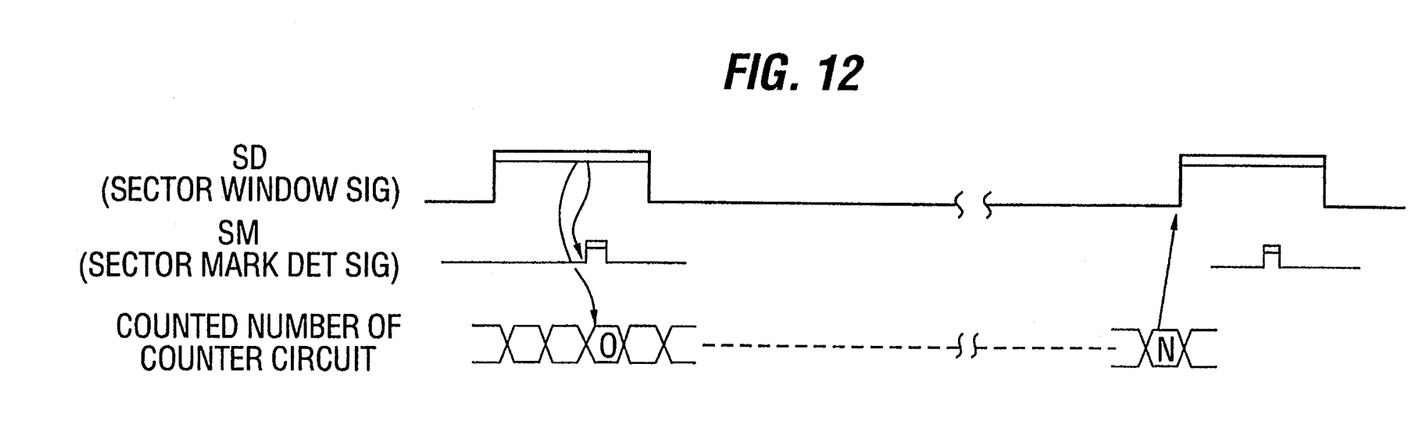
FIG. 12 is a schematic diagram illustrating that a counter circuit of the present invention is loaded with "0" at a time when a sector mark is detected and a sector window signal begins to rise when the counter circuit counts "N"

When the erase detection circuit 30 detects two bytes of erase pattern, it outputs the sector mark detection signal SM. The counter circuit 31a of FIG. 10 is loaded with the initial data "0" as shown in FIGS. 11(d) and 11(h), and it starts to count. When the counter circuit counts a predetermined number N, next sector window signal SD is made to rise as shown in FIG. 12.

Figure 13:
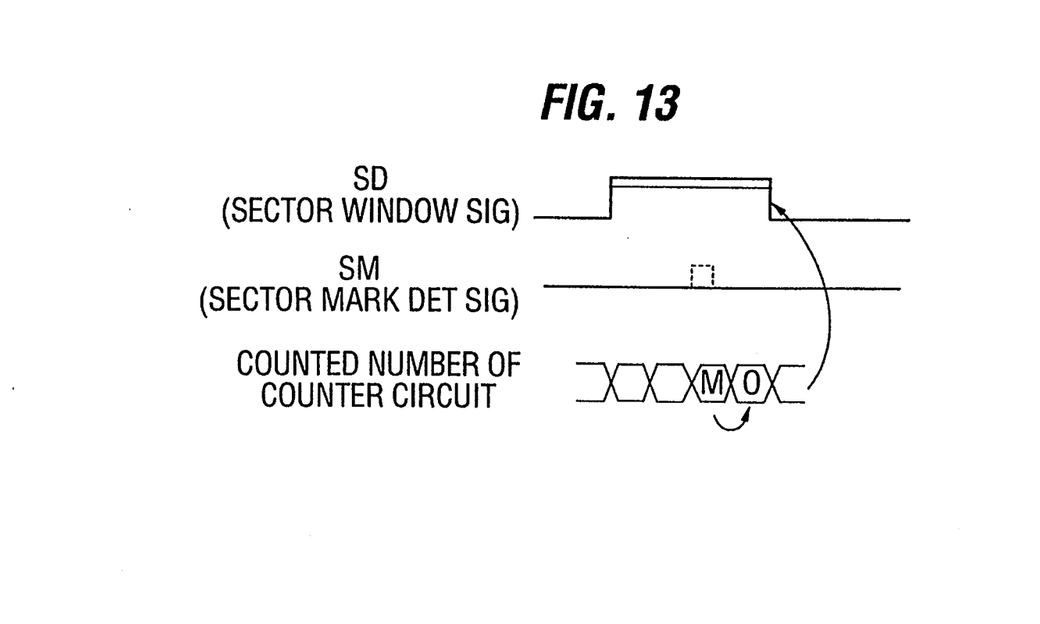
FIG. 13 is a schematic diagram illustrating that the counter circuit of the present invention is loaded with "0" when the counter circuit counts "M" even if the sector mark can not be detected.

Even when the erase detection circuit 30 can not detect two bytes of erase pattern and sector mark detection signal SM is not generated during the sector window signal SD, the counter full signal CTFL from the counter 30a in FIG. 9 loads the data "0" in the counter circuit 31a when the count number reaches a predetermined number M as shown in FIG. 13, and it starts to count from "0".

(3) When the start bit detection circuit 32a receives the byte detection signal BS, it begins to check the RDT signal and detects a pair of pulses forming the start bit and further generates the demodulation start signal ST.

When the data window generation circuit 32b receives the ST signal, it generates the data window signal WD, which is loaded to the flip-flop 321 resulting in outputting the detected signal DT. The detected signal DT has a reproduced waveform having high and low levels expressed by "1" and "0" which correspond to existence and non-existence respectively of a pulse in the RDT signal. The signal DT is input to the shift register 33a having a length such as 20 bits.

(4) The decode counter 33b counts number of pulses in the data window signal WD and, when it counts the predetermined number, the timing gate circuit 33c applies the latch signals RT and RT' to the first and second latch circuits 36a and 36b.

The gray code decoder 34 decodes the gray code sequence into the binary code sequence TA of the track address which is latched in the first latch circuit 36a. The microprocessor MPU 7 can identify the track address through the bus line 9a.

(5) On the other hand, the shift register 33a is operatively connected to the pattern detection circuit 35, where the check pattern comprising 5 supplementary bits and 3 check bits is monitored and checked. In case of FIG. 14, the check pattern can be detected at the time when the decode counter 33b has decoded, for example, the number of counts for filling the shift register full. At this time, the check pattern detection signal CP is output and the counter circuit 31 is loaded with the data "x" and starts to count from data "x" as shown in FIGS. 11(f) and 11(h).

The check pattern detection is also latched in the second latch circuit 36b and the MPU is ready to identify.

Figure 14:
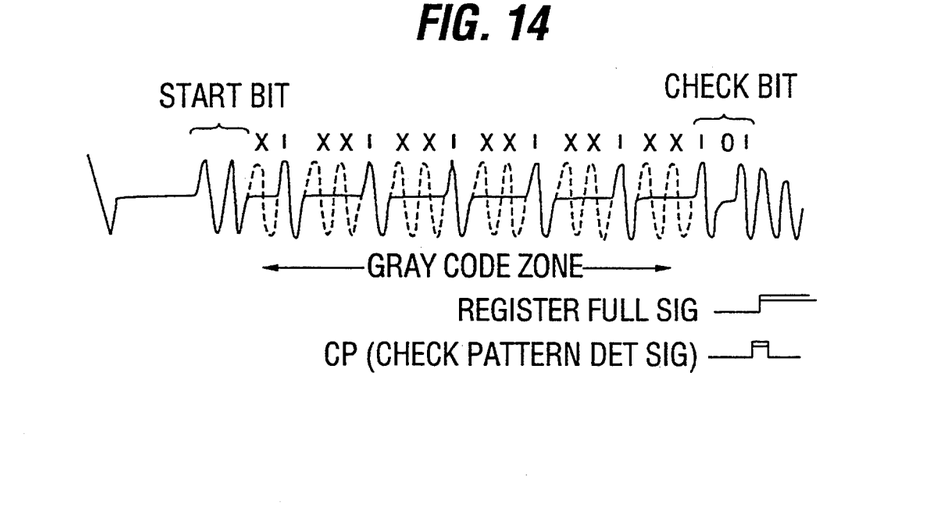
FIG. 14 is a schematic diagram illustrating that the check pattern of the present invention is detected when the shift register is full, and the check pattern detection signal CP is output.
Figure 15:
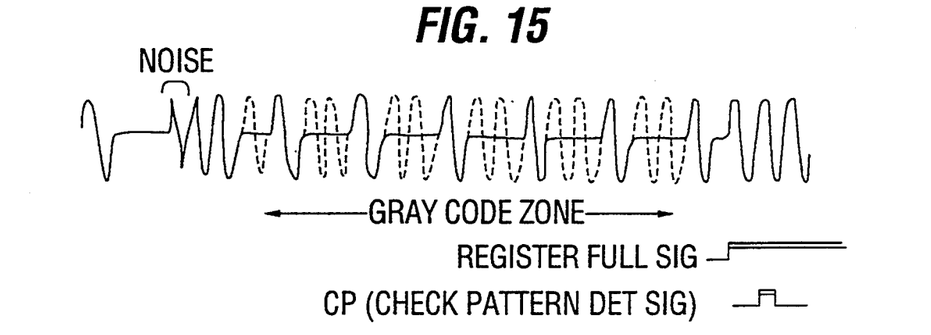
FIG. 15 is a schematic diagram illustrating that the check pattern is detected at a delayed time by one clock after the register full signal in case that noises are included before check pattern signal.

(6) In the case of FIG. 14, the check pattern can be identified at the time when the shift register is full. However, when the RDT signal is affected by preceding noises before the check pattern codes such as shown in FIG. 15, the check pattern can not be identified at the time when the shift register full signal FL is output. In the case of FIG. 15, the check pattern can be identified if detection of the check pattern is carried out at the delayed time by one clock.

In this case, therefore, the delayed time by one clock is regarded as the proper time for the timing gate circuit 33c to issue the latch signal RT to the first latch circuit 36a, thereby the correct binary code of the track address is latched therein. At the same time, the counter circuit 31 is loaded with the data "x" when the check pattern is correctly identified. Thus, the present invention can avoid the noise effects.

If the check pattern is not identified, the counter circuit 31 is not loaded with the data "x".

Figure 16:
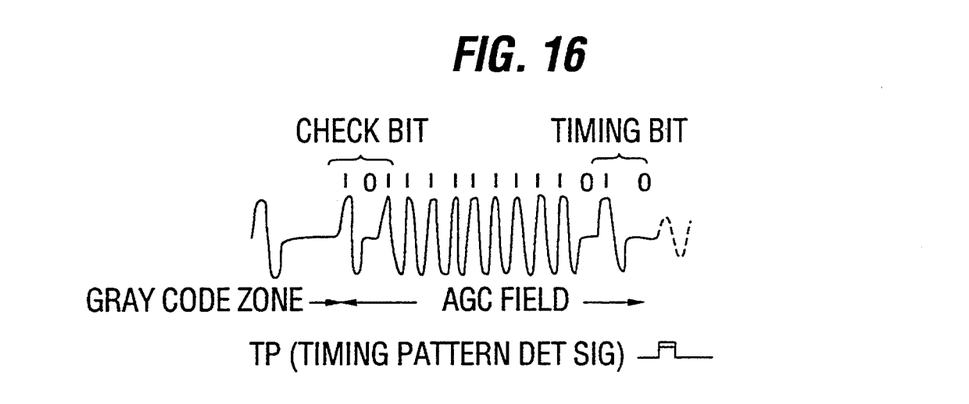
FIG. 16 is a schematic diagram illustrating that the timing pattern is detected and the timing pattern detection signal TP is output.

(7) The shift register 33a continues to operate and the pattern detection circuit 35 searches the timing pattern from the stored data in the shift register 33a. When the timing pattern is detected as shown in FIG. 16, the timing pattern detection signal TP is output. With the signal TP, the counter circuit 31 is loaded with the data "y" as shown in FIGS. 11(g) and 11(h).

The timing pattern detection is latched in the second latch circuit 36b, the MPU is ready to identify. If the timing pattern is not identified, the counter circuit 31 is not loaded with the data "y".

On the other hand, the synchronization check circuit 38 outputs the orientation OK command OROK to the MPU 7 when three detection signals, the sector mark detection signal SM, check pattern detection signal CP, and timing pattern detection signal TP, are detected twice successively in two servo sectors.

Loaded data in the counter circuit 31 is adjusted or revised at each time when the sector mark, check pattern and timing pattern are detected. However, the OROK command is issued only after the sector mark, check pattern and timing pattern are detected twice.

In the present invention, the synchronous condition is checked strictly using three code patterns at an initial stage in generating a group of timing signals which are synchronous with the selected portion of the sector servo information. However, when the synchronous condition is once obtained, the adjustment of synchronization is carried out by any one of three code patterns for avoiding noise effects because the method of the invention has redundancy.

Therefore, in order to establish the synchronous condition by a command of orientation command OR, all three patterns of sector mark, check pattern and timing pattern are checked. Thereafter, the subsequent maintenance of synchronization, in other words, the adjustment of loaded data in the counter circuit 31 is checked by any one of three patterns.

At the time when the orientation OK command OROK is output to the MPU 7, the servo information demodulation circuit 3 is generating a group of timing signals such as servo window signal SWD, sector window signal SD, and servo gate signals A and B, and these timing signals are synchronous with the selected portion of the sector servo information.

The MPU utilizes the detected signals and controls the positioning of the magnetic head.

In the above embodiment, the auxiliary confirming code pattern can be recorded without a basic change in the format of the sector servo information of the prior art. As the auxiliary confirming code pattern, two patterns of the check pattern and timing pattern are provided in the embodiment. These two patterns and the sector mark are formed in separate zones in the servo sector, therefore, detection of the sector servo information and adjustment of synchronization of timing signals are possible even when noises are included in the specific portion of the detected signal such as the sector mark, gray code and AGC code signals.

In the above preferred embodiment, the sector servo information uses the format shown in FIG. 7. However, the present invention is not restricted by the above format, but other formats are also applicable.

The present invention may be applied when only one auxiliary confirming code pattern is included in the sector servo information or three or more auxiliary confirming code.

The present invention may be embodied in other specific forms without departing from the spirit or essential characteristics thereof. The presently disclosed embodiments are therefore to be considered in all respects as illustrative and not restrictive, the scope of the invention being indicated by the appended claims, rather than the foregoing description, and all changes which come within the meaning and range of equivalence of the claims are, therefore, to be embraced therein.

What is claimed is:

1. A method of detecting sector servo information from a reproduced signal generated by a magnetic head moving relative to a disk surface in a disk system, the sector servo information being recorded in servo sectors interspersed alternately with data sectors on the same track on the disk surface, the sector servo information for a servo sector including a sector mark, a track address, and servo position information, said method comprising the steps of:

detecting the sector mark of a first servo sector using a sector window signal activated before detection of the sector mark of the first servo sector, resetting a counter circuit when said sector mark is detected, detecting an auxiliary confirming code pattern from the reproduced signal, the auxiliary confirming code pattern being interspersed in the first servo sector after the sector mark, adjusting a count number of said counter circuit when said auxiliary confirming code pattern is detected, and activating the sector window signal for a second servo sector moving under the magnetic head at a later time than the first servo sector, when the count number of the counter circuit reaches a first predetermined number.

2. A method of detecting sector servo information as recited in claim 1, wherein said auxiliary confirming code pattern comprises first and second auxiliary confirming code patterns.

3. A method of detecting sector servo information as recited in claim 2, wherein said first and second auxiliary confirming code patterns are separated from each other in the first servo sector.

4. A method of detecting sector servo information as recited in claim 2, wherein said first auxiliary confirming code pattern comprises a plurality of track address codes, a plurality of supplementary codes interspersed among the track address codes, and check bits, and said second auxiliary confirming code pattern comprises a plurality of AGC codes and timing bits.

5. A method of detecting sector servo information as recited in claim 1, further comprising the step of:

activating at least one of a servo window signal, a first servo gate signal and a second servo gate signal, if the counter number reaches a second predetermined number.

6. A method of detecting sector servo information as recited in claim 5, wherein said adjusting step is repeated twice before detecting the sector servo information.

7. A method of detecting sector servo information from a reproduced signal generated by a magnetic head in a disk system, the sector servo information being recorded in servo sectors interspersed alternately with data sectors on the same track on a disk surface, the sector servo information for a servo sector including a sector mark, a track address, and servo position information, said method comprising the steps of:

detecting said auxiliary confirming code pattern from the reproduced signal, the auxiliary confirming code pattern being interspersed in a servo sector and including a plurality of supplementary codes of "1" interspersed among the track address encoded in the gray code sequence, adjusting activation timing of the timing signals based on the detection of the auxiliary confirming code pattern, and detecting the sector servo information of the servo sector utilizing said timing signals.

8. A method of detecting sector servo information from a reproduced signal by a magnetic head in a disk system, wherein the sector servo information is recorded in a servo sector interspersed alternately with a data sector on the same track on a disk surface, the sector servo information comprising a sector mark, a track address, and servo position information, and wherein means for detecting the sector mark and means for generating a group of timing signals are provided, said timing signals at least comprising a timing signal synchronous with detection of the sector mark, said method comprising the steps of:

interspersing at least one auxiliary confirming code pattern in the servo sector,     detecting said auxiliary confirming code pattern from the reproduced signal,     adjusting timing of the generation of said group of timing signals based on a detection of the auxiliary confirming code pattern so that a synchronous condition of the timing signal with a timing of detection of the sector servo information is obtained, and     detecting the sector servo information utilizing said timing signals,     said track address being encoded in the gray code sequence and said auxiliary confirming code pattern including a plurality of supplementary codes of "1" interspersed among the gray code sequence.

9. A method of detecting sector servo information from a reproduced signal by a magnetic head in a disk system, wherein the sector servo information is recorded in a servo sector interspersed alternately with a data sector on the same track on a disk surface, the sector servo information comprising a sector mark, a track address, and servo position information, and wherein means for detecting the sector mark and means for generating a group of timing signals are provided, said timing signals at least comprising a timing signal synchronous with detection of the sector mark, said method comprising the steps of:

interspersing at least one auxiliary confirming code pattern in the servo sector,     detecting the sector mark and said auxiliary confirming code pattern from the reproduced signal,     adjusting timing of the generation of said group of timing signals based on a detection of the sector mark and auxiliary confirming code pattern so that the synchronous condition of the timing signal with a timing of detection of the sector servo information is obtained, and     detecting the sector servo information utilizing said timing signals,     said track address being encoded in the gray code sequence and said auxiliary confirming code pattern including a plurality of supplementary codes of "1" interspersed among the gray code sequence.

10. A magnetic disk apparatus comprising at least one disk, a plurality of tracks being formed on a disk surface, each track having a plurality of servo sectors alternating with data sectors, sector servo information being recorded in each servo sector, and the sector servo information including a sector mark, a track address and servo position information, said magnetic disk apparatus further comprising:

a magnetic head for recording and reproducing information on the disk surface;

at least one auxiliary confirming code pattern interspersed in each servo sector;

means for generating a group of timing signals;

means for detecting each of the sector servo information including said sector mark and auxiliary confirming code pattern utilizing said group of timing signals; and     a counter circuit for adjusting activation timing of said group of timing signals by adjusting a count number of the counter circuit each time when said sector mark and said auxiliary confirming code pattern are detected.

11. A magnetic disk apparatus as recited in claim 10, wherein said magnetic disk apparatus includes first and second auxiliary confirming code patterns.

12. A magnetic disk apparatus comprising at least one disk, a plurality of tracks being formed on a disk surface, each track having a plurality of servo sectors interspersed between data sectors, sector servo information being recorded in each servo sector, and the servo information comprising a sector mark, a track address and servo position information, said apparatus further comprising:

a magnetic head for recording and reproducing information on the disk surface,     at least one auxiliary confirming code pattern interspersed in each servo sector,     means for generating a group of timing signals,     means for detecting each of the servo information including said at least one auxiliary confirming code pattern utilizing said group of timing signals, and     means for adjusting generation timing of said group of timing signals to be synchronous with at least the detection of said sector mark and said at least one auxiliary confirming code pattern,     said at least one auxiliary confirming code pattern including a plurality of supplementary codes of bit "1" interspersed among the track address code expressed by the gray code.

13. A magnetic disk apparatus comprising at least one disk, a plurality of tracks being formed on a disk surface, each track having a plurality of servo sectors interspersed between data sectors, sector servo information being recorded in each servo sector, and the servo information comprising a sector mark, a track address and servo position information, said apparatus further comprising:

a magnetic head for recording and reproducing information on the disk surface,     at least one auxiliary confirming code pattern interspersed in each servo sector,     means for generating a group of timing signals,     means for detecting each of the servo information including said at least one auxiliary confirming code pattern utilizing said group of timing signals, and     means for adjusting generation timing of said group of timing signals to be synchronous with at least the detection of said sector mark and said at least one auxiliary confirming code pattern,     a plurality of auxiliary confirming code patterns being recorded in each servo sector, and     said at least one auxiliary confirming code patterns including AGC Code bits and timing bits.

14. A method of detecting sector servo information from a reproduced signal generated by a magnetic head moving relative to a disk surface in a disk system, the sector servo information being recorded in servo sectors interspersed alternately with data sectors on the same track on the disk surface, the sector servo information for a servo sector including a sector mark, a track address, and servo position information, said method comprising the steps of:

interspersing at least two auxiliary confirming code patterns in a first servo sector including a first auxiliary confirming code pattern including a plurality of track address codes, a plurality of supplementary codes interspersed among the track address codes, and check bits, and a second auxiliary confirming code pattern including a plurality of AGC codes and timing bits;

detecting the sector mark of the first servo sector;

generating a plurality of timing signals, at least one of the timing signals being synchronized with a detection of a sector mark of a second servo sector which moved under the magnetic head at an earlier time than the first servo sector;

detecting said first and second auxiliary confirming code patterns from the reproduced signal;

adjusting activation timing of the timing signals based on the detection of the first and second auxiliary confirming code patterns; and detecting the sector servo information utilizing said timing signals.

15. A method of detecting sector servo information from a reproduced signal generated by a magnetic head moving relative to a disk surface in a disk system, the sector servo information being recorded in servo sectors interspersed alternately with data sectors on the same track on the disk surface, the sector servo information for a servo sector including a sector mark, a track address, and servo position information, said method comprising the steps of:

interspersing first and second auxiliary confirming code patterns in a first servo sector, the first auxiliary confirming code pattern including a plurality of track address codes, a plurality of supplementary codes interspersed among the track address codes, and check bits, and the second auxiliary confirming code pattern including a plurality of AGC codes and timing bits;

detecting the sector mark for the first servo sector.;

generating a plurality of timing signals, at least one of the timing signals being synchronized with a detection of a sector mark of a second servo sector which moved under the magnetic head at an earlier time than the first servo sector;

detecting at least one of said first and second auxiliary confirming code patterns from the reproduced signal;

adjusting activation timing of the timing signals based on the detection of said at least one of the first and second auxiliary confirming code patterns; and detecting the sector servo information utilizing said timing signals.

16. A method for use with a data storage disk having sector servo information including a sector mark, a track address, automatic gain control information and servo position information, comprising the steps of:

a) detecting a first pattern in the sector mark;

b) loading a counter with first predetermined data, based on said step (a);

c) counting with the counter;

d) detecting a second pattern in at least one of the track address and automatic gain control information;

e) loading the counter with second predetermined data, based on the said step (d);

f) activating a sector window signal if the counter reaches a first predetermined number in said step (c); and g) activating at least one of a servo window signal, a first servo gate signal and a second servo gate signal, if the counter reaches a second predetermined number in said step (c).

* * * * *